United States Patent
Derrien et al.

(10) Patent No.: US 9,688,013 B2
(45) Date of Patent: Jun. 27, 2017

(54) METHOD FOR THE STRETCH-BLOWING OF A CONTAINER, COMPRISING A RETRACTION OF THE STRETCH ROD DURING A BOXING OPERATION

(75) Inventors: Mikael Derrien, Octeville sur Mer (FR); Thierry Deau, Octeville sur Mer (FR); Pierrick Protais, Octeville sur Mer (FR); Franck Santais, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 133 days.

(21) Appl. No.: 14/115,717

(22) PCT Filed: Apr. 30, 2012

(86) PCT No.: PCT/FR2012/050964
§ 371 (c)(1),
(2), (4) Date: Mar. 27, 2014

(87) PCT Pub. No.: WO2012/156614
PCT Pub. Date: Nov. 22, 2012

(65) Prior Publication Data
US 2014/0203481 A1    Jul. 24, 2014

(30) Foreign Application Priority Data

May 19, 2011 (FR) ..................... 11 54354

(51) Int. Cl.
B29C 49/78 (2006.01)
B29C 49/48 (2006.01)
(Continued)

(52) U.S. Cl.
CPC .......... *B29C 49/4815* (2013.01); *B29C 49/12* (2013.01); *B29C 49/18* (2013.01);
(Continued)

(58) Field of Classification Search
None
See application file for complete search history.

(56) References Cited

U.S. PATENT DOCUMENTS 4,009,980 A * 3/1977 Armour et al. ............... 425/525
4,177,239 A * 12/1979 Gittner et al. ................ 264/530
(Continued)

FOREIGN PATENT DOCUMENTS

EP    1 063 076 A1    12/2000
EP    1 588 825 A1    10/2005
(Continued)

*Primary Examiner* — Monica Huson
(74) *Attorney, Agent, or Firm* — Sughrue Mion, PLLC

(57) ABSTRACT

A method of manufacturing a container from a blank in a stretch blowing assembly equipped with a mold provided with a wall and a mold bottom axially movable between an extended position and a retracted position and a stretch unit having a rod axially movable with respect to the wall and a device for controlling the movement of the rod. The method involves a stretch blowing phase; a boxing phase during which the mold bottom, initially in the extended position, is moved towards its retracted position, the boxing phase having a retraction operation including controlling a movement of the rod in synchronization with the movement of the mold bottom, or releasing the rod to allow the free axial movement thereof.

19 Claims, 8 Drawing Sheets

(51) Int. Cl.
  *B29C 49/12* (2006.01)
  *B29C 49/18* (2006.01)
  *B29C 49/54* (2006.01)
  B29K 267/00 (2006.01)
  B29C 49/06 (2006.01)

(52) U.S. Cl.
  CPC ............ *B29C 49/541* (2013.01); *B29C 49/78* (2013.01); *B29C 49/06* (2013.01); *B29C 2049/4892* (2013.01); *B29K 2267/00* (2013.01)

(56) References Cited

U.S. PATENT DOCUMENTS

| | | | |
|---|---|---|---|
| 6,576,171 B1 * | 6/2003 | Devenoges | 264/40.1 |
| 6,722,868 B1 * | 4/2004 | Evrard | 425/3 |
| 2010/0252945 A1 * | 10/2010 | Eudier et al. | 264/40.5 |

FOREIGN PATENT DOCUMENTS

| | | |
|---|---|---|
| FR | 2 662 631 A1 | 12/1991 |
| FR | 2 798 093 A1 | 3/2001 |
| JP | 6-270235 A | 9/1994 |
| WO | 99/52701 A1 | 10/1999 |

\* cited by examiner

METHOD FOR THE STRETCH-BLOWING OF A CONTAINER, COMPRISING A RETRACTION OF THE STRETCH ROD DURING A BOXING OPERATION

CROSS REFERENCE TO RELATED APPLICATIONS

This application is a National Stage of International Application No. PCT/FR2012/050964 filed Apr. 30, 2012, claiming priority based on French Patent Application No. 1154354 filed May 19, 2011, the contents of all of which are incorporated herein by reference in their entirety.

The invention concerns the manufacture of containers by stretch blowing from blanks of plastic material such as polyethylene terephthalate (PET).

Whether it involves a preform or an intermediate container having already undergone a preforming operation, a blank comprises a body, generally cylindrical in revolution, a neck, which constitutes the mouth of the container to be formed, and a bottom that closes the body opposite the neck.

The conventional manufacturing technique consists of inserting the blank, previously heated to a temperature above the glass transition temperature of the material (about 80° C. in the case of PET), into a mold provided with a wall defining a cavity with the impression of the container, and injecting into the blank, through the neck, a fluid such as a gas (generally air), under pressure to press the material against the wall of the mold.

Under the effect of the pressure, the material softened by the heating forms a bubble that inflates and is developed in an axial direction parallel to the principal axis of the mold, as well as in a radial direction perpendicular to the axis of the mold.

In order to prevent any misalignment of the container and to ensure good uniform distribution of the material, the axial stretching of the blank is forced by means of a rod that is axially movable in the mold, said rod comprising a distal end that pushes the bottom of the blank until it presses against a mold bottom with the impression of the bottom of the container.

It has long been known that the movement of the stretch rod can be controlled by means of a pneumatic cylinder; see for example French patent FR 2 662 631 (DYNAPLAST). Generally, the pneumatic feed of the cylinder is provided by a simple connection to a system of air compressed to seven bars (100 PSI), the speed of the rod being mechanically regulated by means of a cam.

It has recently been proposed to replace the pneumatic control by a magnetic control; see French patent FR 2 798 093 or its American equivalent U.S. Pat. No. 6,722,868, both in the
name of SIDEL. This technology, which has the dual advantage of economizing the pressurized air and limiting the use of wear parts (the magnetic control is produced without contact), is tending to progressively replace the pneumatic control, which is older and inferior in performance.

Both of these technologies pose problems in manufacturing boxed-bottom containers. In this application, the blowing of the container is performed in a cavity of a mold provided with a mold bottom mounted movably in translation with respect to the principal (longitudinal) axis of the mold. Upon completion of the stretching, the mold bottom is moved on said axis towards the cavity, in such a way as to locally over-stretch the material, thus giving the bottom of the container a good capacity of controlled deformation.

This is the reason this application is currently reserved for containers intended to be hot filled, called HR (heat-resistant).

The control for moving the mold bottom is generally pneumatic. The pressure required to move the mold bottom is high, because it is necessary to overcome the resistance due to the blowing pressure (greater than 25 bars) in the container.

The stretch rod must be kept applied against the mold bottom during boxing, in order to limit the risks of slippage (and therefore misalignment) of the bottom of the container during the movement of the mold bottom.

The pneumatic control of the stretch rod does not prohibit the boxing, since the force exerted by the mold bottom on which a pressure of more than 25 bars is applied is far greater than the resistance (negligible in comparison) exerted by the elongation rod, the control pressure of which is only about seven bars. However, the kinetics of boxing, depending on the inertia of the mold bottom and its speed of movement (high in order to prevent the phenomenon of a pinching of the material between the bottom and the wall of the mold), is such that the withdrawal movement of the elongation rod under the force of the mold bottom can prove to be uncontrolled. Rebound phenomena of the rod can appear, which can cause a marking of the bottom of the container and can result in a slippage thereof during the loss of contact of the rod.

With regard to the magnetic control of the stretch rod, it makes boxing difficult to implement because the forces induced on the rod by the control electromagnets are far greater than those induced by an ordinary pneumatic control, and manufacturers are confronted either with the impossibility of performing boxing because of the resistance of the rod, or with damaging the bottom of the container by piercing it between the mold bottom and the stretch rod.

The invention seeks to remedy the aforementioned disadvantages by proposing a solution that makes it possible to limit the risks of deformation or damage during boxing.

To that end, firstly, a method is proposed of manufacturing a container from a plastic blank in a stretch blowing assembly equipped:
  with a mold provided with a wall defining a cavity with the impression of the container, extending along a principal axis of the mold and a mold bottom that is axially movable with respect to the wall between an extended position and a retracted position,
  a stretch unit comprising a stretch rod that is axially movable with respect to the wall and a device for controlling the movement of the rod,
said method comprising:
  a phase of inserting the blank into the mold;
  a phase of stretch blowing, during which a fluid under pressure is injected into the blank and the stretch rod is moved towards the mold bottom until locally pressing the blank against the mold bottom;
  a boxing phase during which the mold bottom, initially in the extended position, is moved towards its retracted position; during said boxing phase, a retraction operation is provided, consisting of:
    controlling a movement of the rod in synchronization with the movement of the mold bottom, or
    releasing the rod to allow the free axial movement thereof.

The device for controlling the movement of the rod, for example, is slaved to the position of the mold bottom.

Secondly, an assembly for stretch blowing containers from plastic blanks is proposed, which comprises:

a mold provided with a wall defining a cavity with the impression of the container, extending along a principal axis, a mold bottom that is axially movable with respect to the wall between an extended position and a retracted position, a stretch rod that is axially movable with respect to the wall, a device for controlling the movement of the rod, which comprises a control unit that is programmed, during a boxing operation consisting of moving the mold bottom from its extended position to its retracted position, to:

control a movement of the stretch rod in synchronization with the movement of the mold bottom, or release the rod from the control device to allow the free axial movement thereof.

According to one embodiment, the rod is disengageably mounted on a movable carriage, for example by means of a movable connecting part. Said connecting part can comprise a piston mounted in a sleeve separated into two chambers, of which at least one is connected to a fluid distributor. The piston is preferably movable along a predetermined stroke, equal to a stroke of the mold bottom.

According to another embodiment, the stretch blowing assembly comprises means of detecting the position of the mold bottom, such as at least one sensor connected to the control unit.

The device for controlling the movement of the rod is preferably electromagnetic.

Thirdly, a machine for manufacturing containers by stretch blowing from plastic blanks is proposed, equipped with one or more stretch blowing assemblies as presented above.

Other objects and advantages of the invention will be seen from the following description, provided with reference to the appended drawings, in which.

Figure 1:
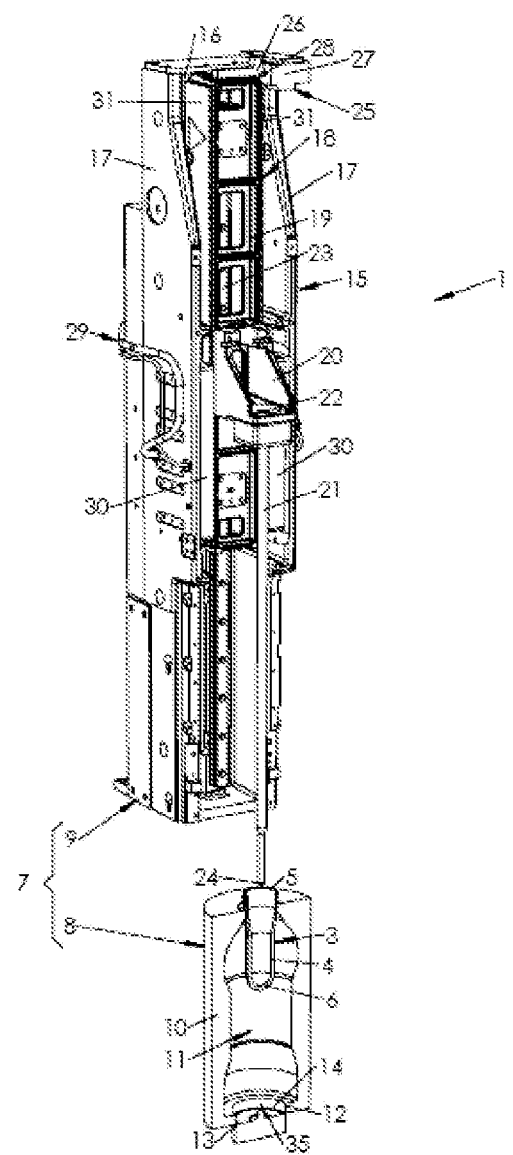
FIG. 1 is a partial view in perspective of an assembly for stretch blowing containers, equipped with a stretching unit represented in the upper position of the stretch rod, at the moment of insertion of a blank into the mold.
Figure 2:
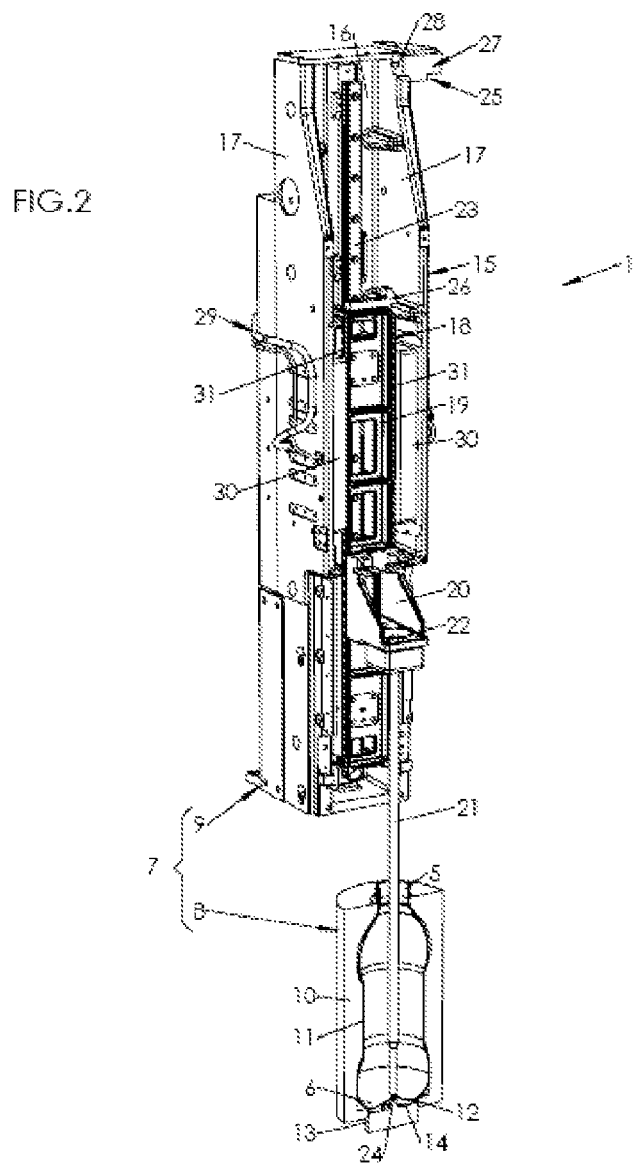
FIG. 2 is a view similar to FIG. 1, showing the stretching unit in the lower position of the stretch rod, at the end of the pre-blowing operation of the container.
Figure 3:
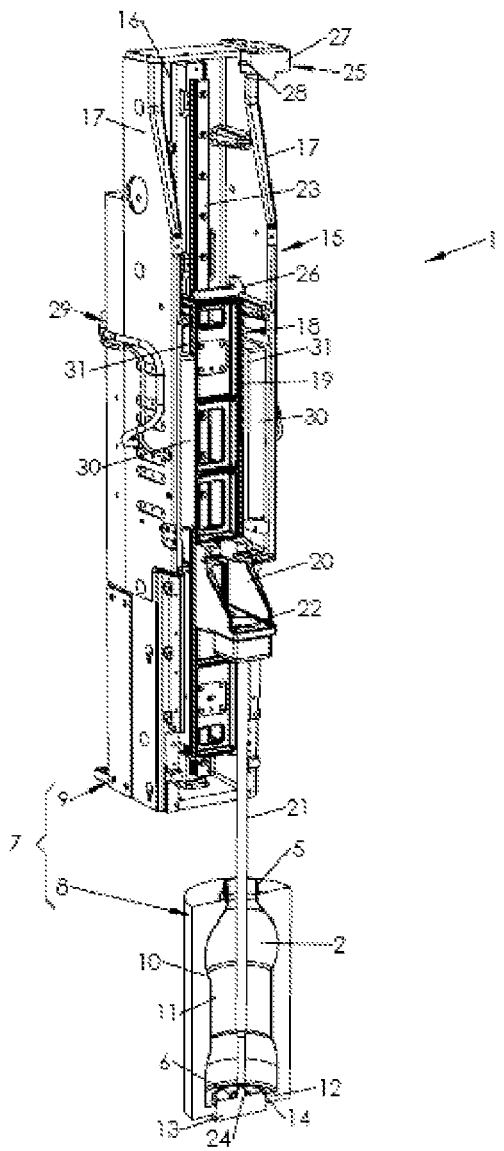
FIG. 3 is a view similar to FIG. 1, showing the stretching unit in the retracted position of the stretch rod, at the end of the boxing operation of the bottom of the container.

Partially represented in FIGS. 1 to 3 is a machine 1 for manufacturing containers 2 by stretch blowing of blanks, in this instance of preforms 3 made of plastic (such as PET), comprising a substantially cylindrical body 4, a neck 5, the shape of which is definitive, and a hemispherical bottom 6 that closes the body 4 opposite the neck 5.

In practice, the machine 1 is equipped with a series of individual stretch blowing assemblies 7, mounted on a carousel (not shown) driven in rotation around a central axis. Each stretch blowing assembly 7, as represented in FIGS. 1 to 3, comprises a mold 8, a stretching unit 9, and blowing means that are known per se and are therefore not shown.

The mold 8, for example, is a split mold and comprises two half-molds articulated around a common hinge and which open to allow, successively, the evacuation of a container 2 that was formed, and the insertion of a preform 3 to be formed that was previously heated in a heating unit.

The mold 8 (clearly seen in FIGS. 4 to 6) comprises a wall 10 defining a cavity 11 with the impression of the container 2, substantially symmetrical in revolution around a principal longitudinal axis X and having, in a lower part, an opening 12 defining a passage for a mold bottom 13 mounted axially movable with respect to the axis X and thus to the wall 10 between:

an extended position (FIGS. 1 and 4) in which the mold bottom 13 is separated from the opening 12, and a retracted position (FIGS. 3 and 6) in which the mold bottom 13 blocks the opening 12.

The mobility of the mold bottom 13 makes it possible to proceed with an over-stretching of the bottom of the container 2 during an operation called "boxing." The movement of the mold bottom 13 is produced, for example, by a double-acting cylinder driven by pressurized gas.

In the configuration illustrated in the figures—given by way of example—where the containers 2 are oriented neck-upwards, the extended position of the mold bottom 13 corresponds to a lower position, and its retracted position to an upper position.

The mold bottom 13 has an upper surface 14, which, in the upper position of the bottom 13, closes the cavity 11 by blocking the opening 12, thus completing the impression of the container 2, against which the material is applied during blowing.

The stretch unit 9 comprises a frame 15, attached to the carousel of the machine 1, which extends vertically, substantially directly above the mold 8. In transverse cross-section, the frame 15 has a U-shaped profile and comprises a back wall 16 flanked by two side walls 17.

The stretch unit 9 comprises a movable assembly 18 including a carriage 19 provided with a protruding arm 20 onto which a stretch rod 21 is attached by an upper end 22. The carriage 19 is mounted slidably, on a rail 23 attached to the back wall 16 of the frame 15, between:

an upper position (FIG. 1) in which the rod 21 is completely outside of the mold 8, a free lower end 24 of the rod 21 at a distance from the mold 8 that is greater than the height of the neck 5, so as to allow the evacuation of a formed container 2 and the insertion of a preform 3 to be blown;

a lower position (FIG. 2) in which the stretch rod 21 is received into the mold 8, coming into the immediate vicinity of the mold bottom 13 (which is then in the extended position), with the material of the container 2 locally sandwiched between the rod 21 and the mold bottom 13.

The stretch unit 9 is provided with a device 25 for locking the carriage 19 in the upper position, which comprises a hook 26 attached to the upper part of the carriage 19, and a latch 27 attached to one of the side walls 17 of the frame 15, the latch 27 being provided with a movable bolt 28 onto which the hook 26 locks in the upper position (FIG. 1) of the carriage 19.

The stretch unit 9 is further equipped with an electromagnetic device 29 that controls the movement of the carriage 19. The control device 29 includes:
- on the frame 15, a pair of electromagnets 30 (also called electromagnetic motors or more simply motors), each attached to one side wall 17 of the frame 15;
- on the carriage 19, a pair of magnetic tracks 31, each formed from a series of permanent magnets with alternating polarity, placed facing and at a short distance from each of the motors 30;
- a control unit 32 (diagrammatically illustrated in FIG. 5), electrically connected to the motors 30, and programmed to deliver an electric control signal to them.

Figure 5:
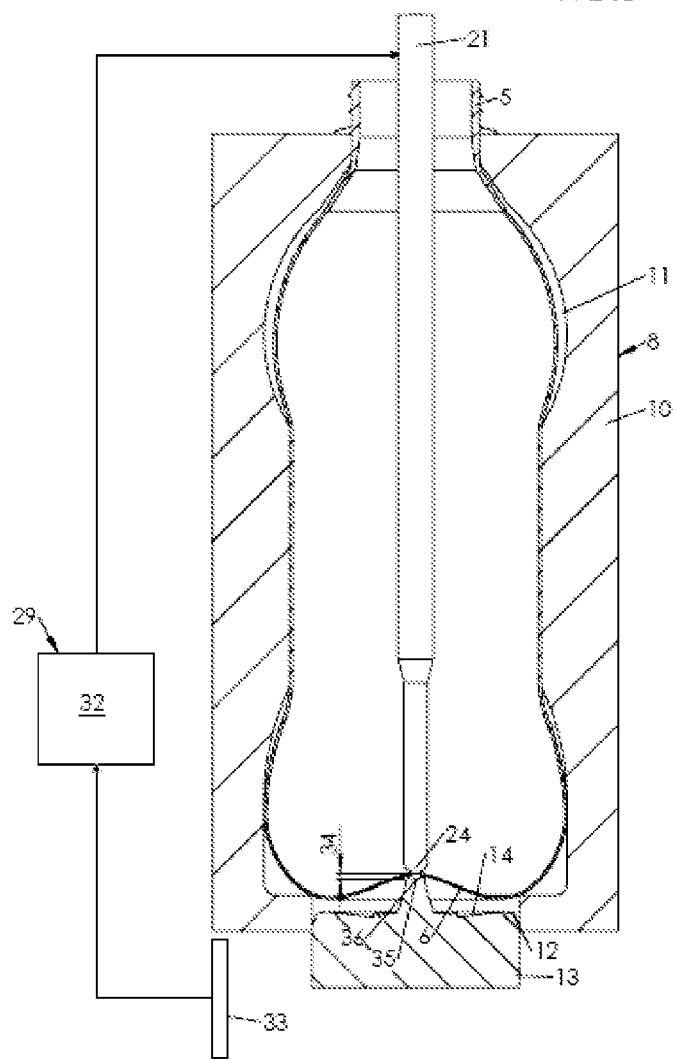
FIG. 5 is a view similar to FIG. 4, at the end of the pre-blowing operation.

According to a first embodiment illustrated in FIG. 5, the position of the carriage 19 is momentarily slaved to the position of the mold bottom 13. The reference value of the position of the mold bottom 13 is for example issued by detection means, such as at least one sensor 33, capable of determining the linear position of the mold bottom 13 along the axis X of the mold 8.

The detection means (in this instance the sensor 33) are for example of the magnetic type, and they can in this case be placed facing a magnetic track attached to the mold bottom 13. As a variant, it may involve one or more capacitive sensors provided with a plurality of sensitive elements detecting successively the presence of a part of the mold 8.

Figure 8:
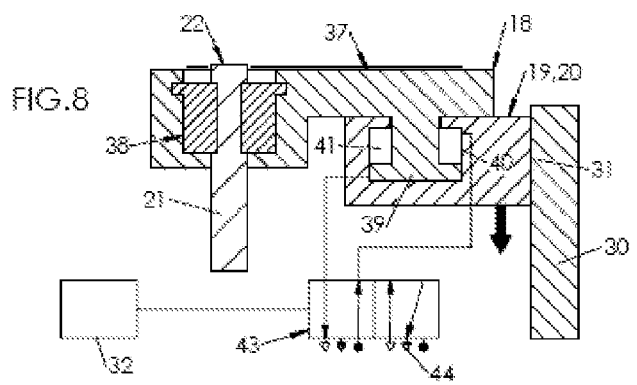
FIGS. 8, 9 and 10 are cross-sectional views illustrating three different positions of the stretch rod, according to a particular embodiment of the rod movement control.
Figure 9:
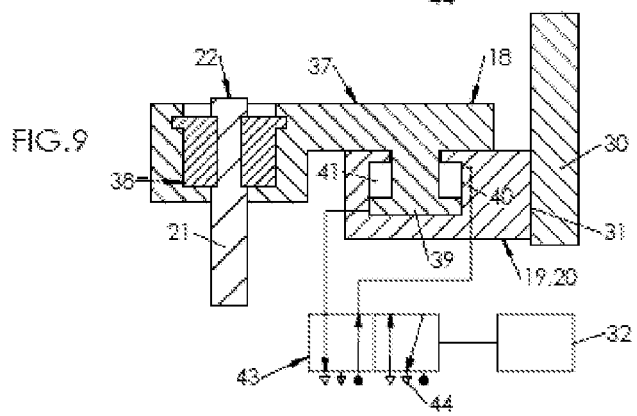
Figure 10:
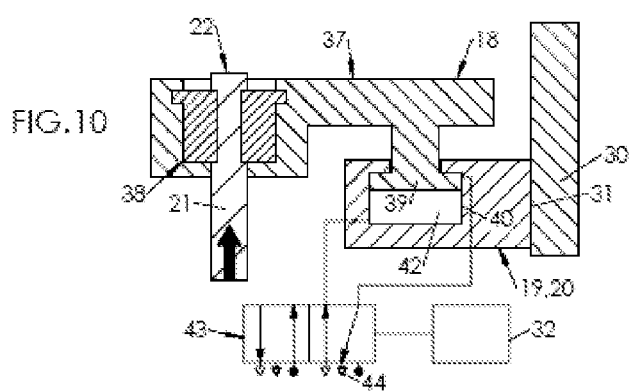

According to a second embodiment, illustrated in FIGS. 8, 9 and 10, the rod 21 can be disengaged, the control unit 32 being programmed to control a momentary release of the rod 21, allowing it to have free axial movement over a predetermined stroke.

A boxed-bottom container 2 is manufactured as follows.

Figure 4:
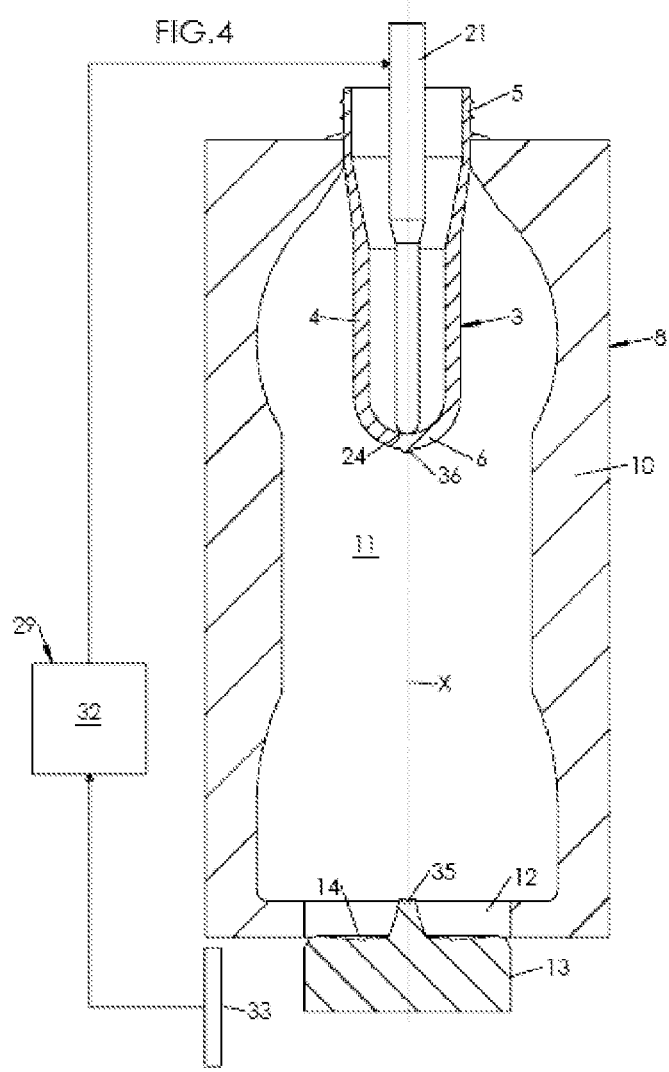
FIG. 4 is a cross-sectional view showing the mold at the moment of commencement of the pre-blowing operation.

A first phase consists of inserting into the mold 8 the preform 3, previously heated to a temperature above the glass transition temperature of the material (about 80° C. in the case of PET). Once the preform 3 is in position and the mold 8 is closed, the control device 29 causes the unlocking, then the movement of the carriage 19 (and thus of the stretch rod 21) from the upper position to a starting position in which the free end 24 of the rod 21 comes into contact with the bottom 6 of the preform 3 (FIG. 4).

A second phase, called stretch blowing, consists of injecting into the preform 3 a fluid (normally air) at a medium pressure called pre-blowing, between 5 bars and 15 bars, while moving the stretch rod 21 from its starting position to its lower position, the mold bottom 13 being held in its extended (low) position. During this phase, the speed of movement of the stretch rod 21 is adjusted in order to maintain contact between the free end 24 of the rod 21 and the bottom 6 of the preform 3.

At the end of this stretch blowing phase (FIGS. 2 and 5):
- the container is not completely formed, several zones still not being in contact with the wall 10 due to insufficient pressure;
- the stretch rod 21, in its lower position, locally presses the bottom 6 of the preform being formed against the mold bottom 13. In other words, the bottom 6 is sandwiched between the free end 24 of the stretch rod 21 and the upper surface 14 of the mold bottom 13.

More specifically, the lower position of the stretch rod 21 is adjusted so that a gap 34 is left between the free end 24 of the rod 21 and the upper surface 14 of the mold bottom 13. The value of this gap 34, which is predetermined, is less than or equal to the local thickness of the material at the center of the bottom 6. In practice, the gap 34 is preferably between 0.2 and 1 mm (and for example about 0.5 mm).

Figure 6:
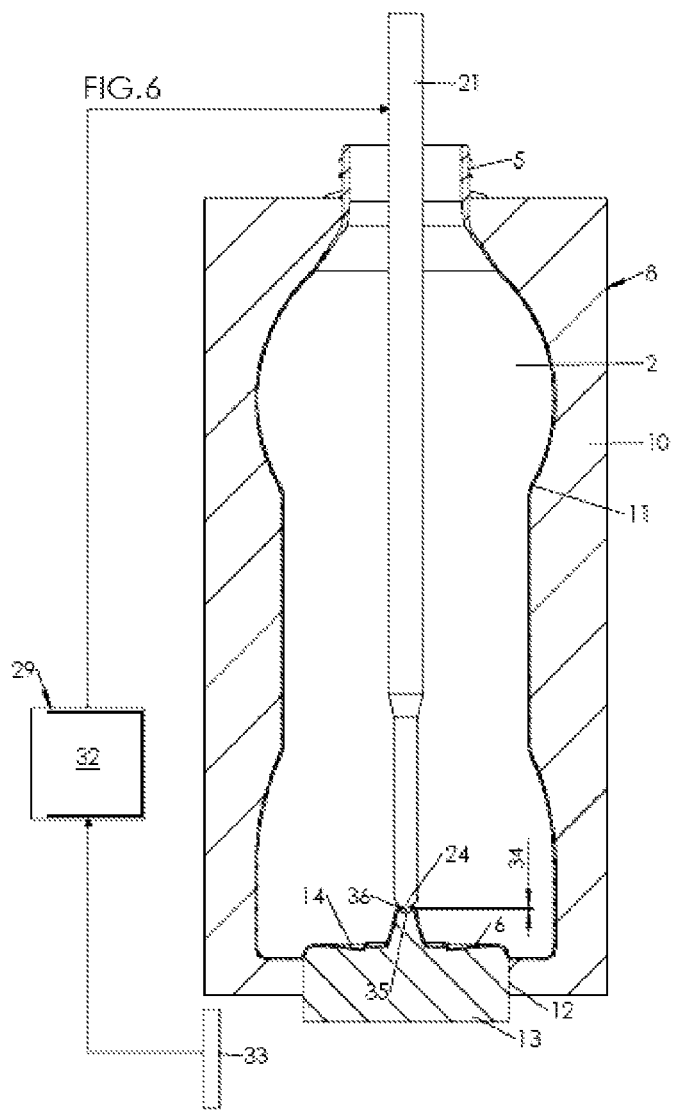
FIG. 6 is a view similar to FIG. 4, at the end of the boxing operation.

As can be clearly seen in the drawings, and particularly in FIGS. 5 and 6, the mold bottom 13 has at its center a hollow recess 35 in which the residual molding tip 36 of the preform 3 is received at the end of stretching. The stretch rod 21 holds the tip 36 in the recess 35 and thus ensures the transverse blocking of the bottom 6, preventing it from slipping during the third phase of the process, called boxing.

The boxing phase consists of moving the mold bottom 13, initially in the extended position, to its retracted position, and of completing the forming by blowing the container 2, injecting into the preform 3, during the raising of the mold bottom 13, a fluid (air) at a high pressure (called blowing pressure, greater than 25 bars). The blowing pressure is maintained for a predetermined period of time—called stabilization period—after which the mold bottom 13 has reached its upper position. The blowing pressure presses the material tightly against the wall 10 of the mold 8 and the upper surface 14 of the mold bottom 13, thus conforming the container 2 to the impression of the cavity 11.

The boxing phase comprises a retraction operation, which consists, during the movement of the mold bottom 13 to its retracted position (in other words during the raising of the mold bottom 13 to its upper position),
- either, according to a first embodiment, of moving the stretch rod 21 in synchronization with (or slaved to) the mold bottom 13, while maintaining constant the gap 34 between the free end 24 of the rod 21 and the upper surface 14 of the mold bottom 13. In this way, the rod 21 integrally accompanies the movement of the mold bottom 13,
- or, according to a second embodiment, of releasing the rod 21 to allow free axial movement of the rod 21 during the raising of the mold bottom 13.

In the first embodiment, the movement of the rod 21 is not passive (i.e., the rod 21 is not pushed by the bottom 13 while it is being raised) but is active: this movement is controlled by the electromagnetic control device 29, which delivers to the motors 30 a signal to control the raising of the carriage 19, i.e., the movement thereof towards its upper position.

The electric command issued by the control device 29 is slaved according to at least one position reference value of the mold bottom 13, issued by the sensor 33.

It is also possible to slave the electric command to move the carriage 19 to the speed of movement of the mold bottom 13 during the boxing, in order to take into account the dynamics of the boxing and avoid possible jerks in the movement of the rod 21, which could result in damage to the material (still soft) of the bottom 6.

In the second embodiment, illustrated in FIGS. 8 to 10, the rod 21 can be disengaged by being coupled to the arm 20 of the carriage 19 by means of a movable connecting part 37 forming a cylinder.

At a front end, the connecting part 37 includes a flange 38 for the rigid attachment of the rod 21 to its upper end 22. At a rear end, the connecting part 37 includes (or is preferably made up of) a piston 39 received in a sleeve 40 formed in the arm 20.

The piston 39 separates the sleeve 40 into an upper chamber 41 and a lower chamber 42. According to a preferred embodiment, illustrated in FIGS. 8, 9 and 10, the cylinder thus formed by the connecting part 37 is of the single effect type, the chambers 41 and 42 being connected to a five-way fluid distributor 43 with two positions:

a load position (FIGS. 8 and 9) in which the upper chamber 41 is connected to a source of fluid pressure (preferably hydraulic in order to achieve high pressures) and the lower chamber 42 is connected to the open air;

an exhaust position (FIG. 10) in which the upper chamber 41 is placed in communication with an exhaust 44 and the lower chamber 42 is still connected to the open air.

The distributor 43 is controlled by the control unit 32.

The piston 39 and the sleeve 40 are dimensioned so that the stroke of the piston 39 is equal to the stroke of the mold bottom 13 during the boxing operation. In one variant, the lower chamber 42 is simply permanently connected to the open air by a piercing made in the arm 20, while the upper chamber 41 is connected to a three-way, two-position distributor: a load position in which the upper chamber 41 is in communication with the source of fluid pressure, and an exhaust position in which the upper chamber 41 is placed in communication with an exhaust.

In another variant, the rod remains integrally connected to the carriage 19, but it is the coupling of the carriage to the motors 30 that can be disengaged, the release of the carriage 19 (and thus the rod 21) being controlled by the control unit 32.

In this case, the control unit 32, which is normally programmed to apply to the carriage 19, via the motors 30, a downward electromotive force (during the descent of the rod 21) or upward (during the raising of the rod 21), is also programmed to modify, for example by momentarily nullifying, during the time of the boxing operation, the electromotive force reference value applied to the rod 21, in order to release the rod and allow the raising of the mold bottom 13 without resistance.

Moreover, in order to prevent (or limit) a possible rebound of the rod 21 at the end of boxing, when the mold bottom 13 reaches its upper position, it is possible to program an electromagnetic stop for the rod 21 in the control unit 32. Said stop can be produced by programming a raising of the rod 21 during the boxing, over a stroke distance equal to (or, in order to preserve a margin of safety, slightly greater than) the stroke distance of the mold bottom 13. Because of the simultaneous shutoff of the electromotive force, the rod 21 remains free during boxing, but it cannot rise beyond its programmed end of stroke.

Irrespective of the embodiment used, the operation is as follows. During the stretch blowing phase, the distributor 43 is in the load position, the position of the rod 21, which has no axial range of movement, being determined by the control unit 32, which provides the movement of the carriage 19 (in the direction of the arrow in FIG. 8). This configuration is maintained until the rod 21 reaches its lower position.

At the start of the boxing operation, the movement of the mold bottom 13 and the release of the rod 21 are simultaneously controlled by the control unit 32. The rod 21 then does not offer any resistance (other than its own weight) to the raising of the mold bottom 13, until it reaches its upper position. The raising of the rod 21 during the boxing (in the direction of the arrow in FIG. 10) is therefore passive, the rod 21 being simply pushed by the mold bottom 13 over a distance equal to its stroke distance.

A fourth phrase at the end of the stabilization period, called exhausting, consists of venting the container 2 thus formed to the atmosphere. The pressure then drops until it asymptotically reaches atmospheric pressure. The mold bottom 13 is then moved to its lower position, the carriage 19 (with the rod 21) is raised to its upper position, the mold 8 is opened and the formed container 2 is evacuated to allow the repetition of the cycle.

Figure 7:
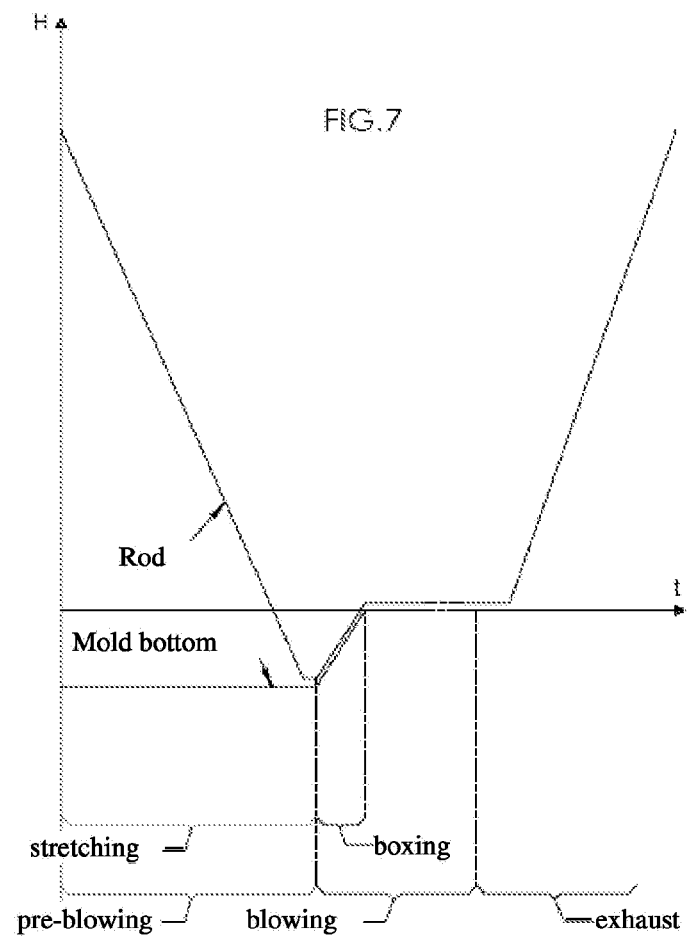
FIG. 7 is a diagram illustrating the respective positions, measured along the axis of the mold, of the stretch rod and of the mold bottom, with respect to an origin corresponding to the upper position of the mold bottom at the end of boxing.

The diagram in FIG. 7 shows the respective axial positions (or heights) of the free end 24 of the stretch rod 21 and of the center of the mold bottom 13, while arbitrarily allocating the value of zero to the height of the center of the bottom 13 in its raised (upper) position.

It can be seen that, in the stretching phase, the bottom 13 maintains its extended (lower) position while the rod 21 descends from the upper position to the lower position, said lower position being reached when the rod 21 reaches the height of the center of the bottom 13 plus the gap 34.

During the boxing phase, the bottom 13 and the rod 21 are simultaneously raised towards their respective upper positions, the gap 34 between them remaining constant. It can be seen that after the bottom 13 and the rod have both reached their upper positions, they are temporarily held in that position during at least the stabilization period. The exhausting then occurs, followed by the raising of the rod 21.

It is preferable to control the raising of the carriage 19 before placing the distributor 43 in the load position again, in order to prevent the rod 21 from being pushed abruptly downwards and thus damaging the bottom of the container 2. The return of the distributor 43 to the load position can be controlled during the raising of the rod 21, when there is sufficient distance separating it from the bottom of the container 2.

The stretch blowing assembly 7 and its method of operation that have just been described offer the following advantages:

- the movement of the mold bottom 13 is not prevented or even slowed down by the presence of the stretch rod 21, which is withdrawn and frees up space for the mold bottom 13 as it rises;
- the bottom 6 of the container 2 is kept centered with respect to the mold bottom 13 during the boxing, without the possibility of slippage, with a substantially constant holding force resulting from the simultaneous movement of the rod 21 and the bottom 13;
- the bottom 6 of the container 2 is not damaged at its center during the boxing because the rod 21 does not exert any force on the bottom 6 during the boxing, which avoids piercing the material.

The invention claimed is:

1. A method of manufacturing a container from a plastic blank in a stretch blowing assembly equipped:

with a mold provided with a wall defining a cavity with an impression of the container, extending along a principal axis of the mold and a mold bottom that is axially movable with respect to the wall between an extended position and a retracted position, with a stretch unit comprising a carriage provided with a protruding arm onto which a stretch rod is attached, the stretch rod is axially movable with respect to the wall and a control device for controlling the movement of the stretch rod, said method comprising:

a phase of inserting the blank into the mold;

a phase of stretch blowing, during which a fluid under pressure is injected into the blank and the stretch rod is moved towards the mold bottom until locally pressing the blank against the mold bottom, the lower position of the stretch rod being adjusted so that a gap is left between a free end of the stretch rod and an upper surface of the mold bottom;

a boxing phase wherein:
the mold bottom, initially in the extended position, is moved towards the retracted position; and
a retraction operation is performed comprising:
moving the stretch rod slaved to the mold bottom, while maintaining constant the gap between the free end of the rod and the upper surface of the mold bottom, the stretch rod integrally accompanies the movement of the mold bottom, an electric command issued by the control device is slaved to move the carriage to the speed of movement of the mold bottom during the boxing phase, or
releasing the stretch rod to allow raising of the mold bottom without resistance by the stretch rod; the stretch rod being simply pushed by the mold bottom over a distance equal to the stroke distance of the mold bottom; and
stopping the stretch rod to prevent rebound of the stretch rod at an end of the boxing phase, when the mold bottom reaches the retracted position.

2. An assembly for stretch blowing containers from plastic blanks, which comprises:
a mold provided with a wall defining a cavity with an impression of the container, extending along a principal axis,
a mold bottom that is axially movable with respect to the wall between an extended position and a retracted position,
a stretch unit, a carriage provided with a protruding arm onto which a stretch rod is attached, the stretch rod that is axially movable with respect to the wall and an electromagnetic control device for controlling the movement of the stretch rod, the lower position of the stretch rod being adjusted so that a gap is left between a free end of the stretch rod and an upper surface of the mold bottom;
wherein the electromagnetic control device comprises a control unit that is programmed:
during a boxing operation comprising moving the mold bottom from the extended position to the retracted position, to:
control a movement of the stretch rod in synchronization with the movement of the mold bottom by moving the stretch rod slaved to the mold bottom, while maintaining constant the gap between the free end of the rod and the upper surface of the mold bottom, the stretch rod integrally accompanies the movement of the mold bottom, an electric command issued by the control device is slaved to move the carriage to the speed of movement of the mold bottom during the boxing phase; or
release the stretch rod of the control device to allow free axial movement and raising of the mold bottom without resistance by the stretch rod, the stretch rod being simply pushed by the mold bottom over a distance equal to its stroke distance; and
at an end of the boxing operation to provide an end stop of the stretch rod.

3. The stretch blowing assembly according to claim 2, wherein the device for controlling the movement of the stretch rod is slaved to the position of the mold bottom.

4. The stretch blowing assembly according to claim 2, wherein the stretch rod is disengageably mounted on a movable carriage.

5. The stretch blowing assembly according to claim 4, wherein the stretch rod is mounted on the carriage by means of a movable connecting part.

6. The stretch blowing assembly according to claim 5, wherein the connecting part comprises a piston mounted in a sleeve, the piston separates the sleeve into two chambers, of which at least one is connected to a fluid distributor.

7. The stretch blowing assembly according to claim 6, wherein the piston is movable over a predetermined stroke distance equal to a stroke distance of the mold bottom.

8. The stretch blowing assembly according to claim 2, comprising means for detecting or monitoring the position of the mold bottom.

9. The stretch blowing assembly according to claim 2, wherein the control unit is programmed to modify, during the boxing phase, a reference value of electromotive force applied to the stretch rod.

10. A machine for manufacturing containers by stretch blowing from plastic blanks, the machine equipped with one or more stretch blowing assemblies according to claim 2.

11. The stretch blowing assembly according to claim 8, wherein the means for detecting or monitoring the position of the mold comprises at least one sensor connected to the control unit.

12. An assembly for stretch blowing containers from plastic blanks, comprising:
a mold defining a cavity with an impression of a container, the cavity extending along a principal axis;
a mold bottom axially movable with respect to the cavity between an extended position and a retracted position;
a stretch unit, comprising a stretch rod axially movable within the cavity;
a control unit programmed to control movement of the stretch rod so that the stretch rod is slaved to the movement or position of the mold bottom or is released to allow free axial movement of the stretch rod, the control of the movement of the stretch rod occurring during a boxing operation comprising moving the mold bottom from the extended position to the retracted position;
the control unit further programmed, at an end of the boxing operation when the mold bottom reaches the retracted position, to activate an electromagnetic stop of the stretch rod to prevent rebound of the stretch rod.

13. The assembly according to claim 11, wherein the control unit is programmed to control, during the boxing operation, movement of the stretch rod so that the stretch rod is slaved to the movement or position of the mold bottom.

14. The assembly according to claim 11, wherein the control unit programmed to control, during the boxing operation, movement of the stretch rod in which the stretch rod is released to allow free axial movement of the stretch rod.

15. The assembly according to claim 11, wherein movement of the stretch rod is electromagnetically driven.

16. The method of claim 1, wherein the control unit is programmed, during the boxing operation to control a movement of the stretch rod in synchronization with the movement of the mold bottom by moving the stretch rod slaved to the mold bottom, while maintaining constant the gap between the free end of the rod and the upper surface of the mold bottom.

17. The method of claim 1, wherein the control unit is programmed, during the boxing operation to release the stretch rod of the control device to allow free axial movement and raising of the mold bottom without resistance by of the stretch rod.

18. The method of claim 1, wherein the retraction operation comprises during the boxing phase moving the stretch rod slaved to the mold bottom, while maintaining constant the gap between the free end of the rod and the upper surface of the mold bottom, while the stretch rod integrally accompanies the movement of the mold bottom, and an electric command issued by the control device is slaved to move the carriage to the speed of movement of the mold bottom during the boxing phase.

19. The stretch blowing assembly according to claim 2, wherein the stretch rod integrally accompanies the movement of the mold bottom, and the electric command issued by the control device is slaved to move the carriage to the speed of movement of the mold bottom during the boxing phase.

* * * * *